(12) United States Patent
Dai et al.

(10) Patent No.: US 12,212,798 B1
(45) Date of Patent: Jan. 28, 2025

(54) CROSS-PERIOD QUALITY SMOOTHING IN ADAPTIVE BITRATE ALGORITHM

(71) Applicant: Beijing YoJaJa Software Technology Development Co., Ltd., Beijing (CN)

(72) Inventors: Tongyu Dai, Beijing (CN); Si Chen, Beijing (CN); Wenhao Zhang, Beijing (CN); Boya Lai, Beijing (CN); Chao Li, Beijing (CN); Weiran Shi, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/451,037

(22) Filed: Aug. 16, 2023

(30) Foreign Application Priority Data

Aug. 2, 2023 (CN) .......................... 202310968185.4

(51) Int. Cl.
*H04N 21/2662* (2011.01)
*H04L 65/752* (2022.01)
*H04L 65/80* (2022.01)

(52) U.S. Cl.
CPC ....... *H04N 21/2662* (2013.01); *H04L 65/752* (2022.05); *H04L 65/80* (2013.01)

(58) Field of Classification Search
CPC .... H04L 65/752; H04L 65/80; H04N 21/2662
See application file for complete search history.

(56) References Cited

U.S. PATENT DOCUMENTS

| | | | | |
|---|---|---|---|---|
| 10,735,739 | B2* | 8/2020 | Mao | H04N 19/197 |
| 10,958,947 | B1* | 3/2021 | Wei | H04N 21/236 |
| 11,172,246 | B1* | 11/2021 | Fang | H04N 21/24 |
| 11,190,826 | B1* | 11/2021 | Labrozzi | H04N 21/234345 |
| 11,509,703 | B2* | 11/2022 | Chu | H04N 19/59 |
| 11,895,173 | B2* | 2/2024 | Mamidwar | H04N 21/23439 |
| 2019/0327510 | A1* | 10/2019 | Kalagi | H04N 21/44209 |
| 2020/0099733 | A1* | 3/2020 | Chu | H04N 21/8456 |
| 2023/0171454 | A1 | 6/2023 | Labrozzi et al. | |

OTHER PUBLICATIONS

Anant Shukla and Avni Gupta. "Effective Context-Aware Bitrate Ladder Construction for Adaptive Video Streaming". CHI'20, Apr. 25-30, 2020, Honolulu, HI, USA, 8 pages. (Year: 2020).*
Angeliki V. Katsenou et al. "Efficient Bitrate Ladder Construction for Content-Optimized Adaptive Video Streaming", IEEE Open Journal of Signal Processing, vol. 2, Jun. 4, 2021, 17 pages (including cover page). (Year: 2021).*

(Continued)

*Primary Examiner* — George C Neurauter, Jr.
(74) *Attorney, Agent, or Firm* — Kwan & Olynick LLP (57) ABSTRACT

In some embodiments, a method generates a reward function for an adaptive bitrate function that is based on a bandwidth and profiles in a profile ladder for a current segment of content. The reward function indicates a first profile should be selected for the current segment. The method performs a quality change analysis to select a second profile from the profile. The quality change analysis analyzes a quality change that is based on a previously selected profile from a prior segment and profiles in the profile ladder. The second profile is requested from the profile ladder for the current segment.

20 Claims, 9 Drawing Sheets

(56) References Cited

OTHER PUBLICATIONS

Tianchi Huang et al. "Deep Reinforced Bitrate Ladders for Adaptive Video Streaming", In Workshop on Network and Operating System Support for Digital Audio and Video (NOSSDAV '21)) (NOSSDAV '21), Sep. 28-Oct. 1, 2021, Istanbul, Turkey. ACM, New York, NY, USA, Article 4, 7 pages. (Year: 2021).*

Jan De Cock et al. "Complexity-Based Consistent-Quality Encoding in the Cloud". IEEE, ICIP 2016, 5 pages. (Year: 2016).*

Weihe Li et al. "RAV: Learning-Based Adaptive Streaming to Coordinate the Audio and Video Bitrate Selections". IEEE Transactions on Multimedia, vol. 25, 2023, 14 pages. (Year: 2023).*

Kevin Spiteri, et al., "BOLA: Near-Optimal Bitrate Adaptation for Online Videos," arXiv:1601.06748v3 [cs.NI] Jun. 18, 2020, 15 pages.

Xiaoqi Yin, et al., "A Control-Theoretic Approach for Dynamic Adaptive Video Streaming over http," Sigcomm '15: Proceedings of the 2015 ACM Conference on Special Interest Group on Data Communication, Aug. 2015, pp. 325-338; https://doi.org/10.1145/2785956.2787486.

Extended European Search Report, EP Application No. 24186820.7, mailed Dec. 10, 2024, 9 pages.

Minh Nguyen et al., "WISH: User-centric Bitrate Adaptation for HTTP Adaptive Streaming on Mobile Devices", 2001 IEEE 23rd International Workshop on Multimedia Signal Processing, Oct. 2021, 6 pages.

* cited by examiner

|  201-1    | 202-1      | 204-1        |
|-----------|------------|--------------|
| Profile   | Resolution | Bitrate (bps)| ← 208
| 0         | 640x360    | 573801       |
| 1         | 1280x720   | 1781428      |
| 2         | 1920x1080  | 2771172      |
| 3         | 1920x1080  | 2961380      | ← 210
| 4         | 2560x1440  | 4324470      |

|  201-2    | 202-2      | 204-2         |
|-----------|------------|---------------|
| Profile   | Resolution | Bitrate (bps) | ← 212
| 0         | 640x360    | 710538        |
| 1         | 854x480    | 1545866       |
| 2         | 960x540    | 2063766       | ← 218
| 3         | 1280x720   | 4334738       | ← 214
| 4         | 1920x1080  | 5287095       |
| 5         | 1920x1080  | 6073547       |

|  201-3    | 202-3      | 204-3        |
|-----------|------------|--------------|
| Profile   | Resolution | Bitrate (bps)|
| 0         | 640x360    | 723165       |
| 1         | 854x480    | 1499532      |
| 2         | 1280x720   | 3609421      |
| 3         | 1280x720   | 4552124      |
| 4         | 1920x1080  | 5068163      |
| 5         | 1920x1080  | 6377429      |
| 6         | 2560x1440  | 8123416      |

| Profile | Resolution | Bitrate (kbps) |
|---|---|---|
| 0 | 640x360 | 573 |
| 1 | 854x480 | 923 |
| 2 | 1280x720 | 1446 |
| 3 | 1280x720 | 1781 |
| 4 | 1920x1080 | 2371 |
| 5 | 1920x1080 | 2961 |
| 6 | 2560x1440 | 4324 |

CROSS-PERIOD QUALITY SMOOTHING IN ADAPTIVE BITRATE ALGORITHM

CROSS REFERENCE TO RELATED APPLICATIONS

Pursuant to 35 U.S.C. § 119(a), this application is entitled to and claims the benefit of the filing date of Chinese Application No. 202310968185.4 filed Aug. 2, 2023 in China, the content of which is incorporated herein by reference in its entirety for all purposes.

BACKGROUND

In a video streaming system, a video provider may use a content delivery network (CDN) to store segments of content (e.g., video or audio) and deliver the segments to clients. To improve the quality of video delivery, the content may be offered in multiple profiles that have different quality and bitrate characteristics. In a simple example, a profile ladder may include a high bitrate/high quality, a medium bitrate/medium quality, and a low bitrate/low quality profile; however, the profile ladder may have more profiles. The client may analyze the network conditions to determine a profile to select from the profile ladder. For example, the client may use an adaptive bitrate (ABR) algorithm to select a suitable profile for a video segment to download from the content delivery network based on the current network conditions. The adaptive bitrate algorithm may consider the estimated available network bandwidth and the bitrate of upcoming segments to determine the profile to request for one or more upcoming segments. For example, if the current network conditions have a high available bandwidth, the client selects the high bitrate/high quality profile, and if the current network conditions have a low available bandwidth, the client selects the low bitrate/low quality profile. This process may work well when the profile ladder being used is consistent during the whole life cycle of the session. However, in some cases, the video ladder may not be the same through the whole playback session.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Described herein are techniques for a video streaming system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A video streaming system may deliver content during a streaming session that may include multiple periods. In some embodiments, the streaming session may include a bumper period, a supplemental content period, and a main content period, but other periods may be used, such as multiple supplemental content periods, an ending period, etc. The bumper period may include an introduction, such as a logo of the video provider or production company, a preview of the main content, or other content. The supplemental content may include supplemental content that is added to the main content. The supplemental content may be advertisements that are inserted during breaks of the main content playback. The main content may be the content that is requested by a user account for playback, such as a movie, a show, etc. The ending content may be content that is played after the main content.

The different periods may have associated profile ladders that may be different. For example, the bumper content, supplemental content, or main content may be different in that the content displayed in each period may be not related. For example, the bumper content may be a preview of a show, and the supplemental content may be an advertisement that is not related to the preview of the show. The bumper period may use a first profile ladder and the supplemental content period may use a second profile ladder. The first profile ladder and the second profile ladder may have profiles that have different resolutions and bitrates. Further, the main content may have content that is not related to the supplemental content, such as the characters of a show or movie are not found in the supplemental content. A third profile ladder for the main content may be different from the first profile ladder and the second profile ladder.

When the streaming session transitions between different profile ladders, such as from one period to another period, the playback experience may become degraded. For example, the content being played back in the bumper period may be of a higher resolution. However, when the supplemental content period starts, low resolution content may be displayed due to using a different profile ladder. As will be described below, the first profile ladder may display content at a resolution of 2560×1440 for a bitrate of around 4500000 bits per second (bps), but the second profile ladder may display content at a resolution of 1280×720 for around the same bitrate. In this case, a segment at a resolution of 2560×1440 may be displayed and then the next segment is at a resolution of 1280×720. The abrupt changing of resolutions may be noticeable to viewers and degrade the playback experience.

In some embodiments, a system improves the profile selection of the adaptive bitrate algorithm when profile ladders may change, such as when there is a period change. The adaptive bitrate algorithm may consider network bandwidth and the bitrate of the video profile, but also consider the change in quality. Considering the change in quality when selecting a new profile may improve the playback experience by smoothing the transition when playing back multiple segments. For example, the difference in quality when the streaming session transitions from a bumper period to a supplemental content period may be not as drastic when the quality change is considered by the adaptive bitrate algorithm. As will be described in more detail below, the adaptive bitrate algorithm may consider the change in quality level or change in profile levels when making a decision on selecting a new profile. Although the following will discuss considering the quality change when a period change occurs or the profile ladder changes, the adaptive bitrate algorithm may consider the quality change during the entire playback session even if the same profile ladder is being used.

System

Figure 1:
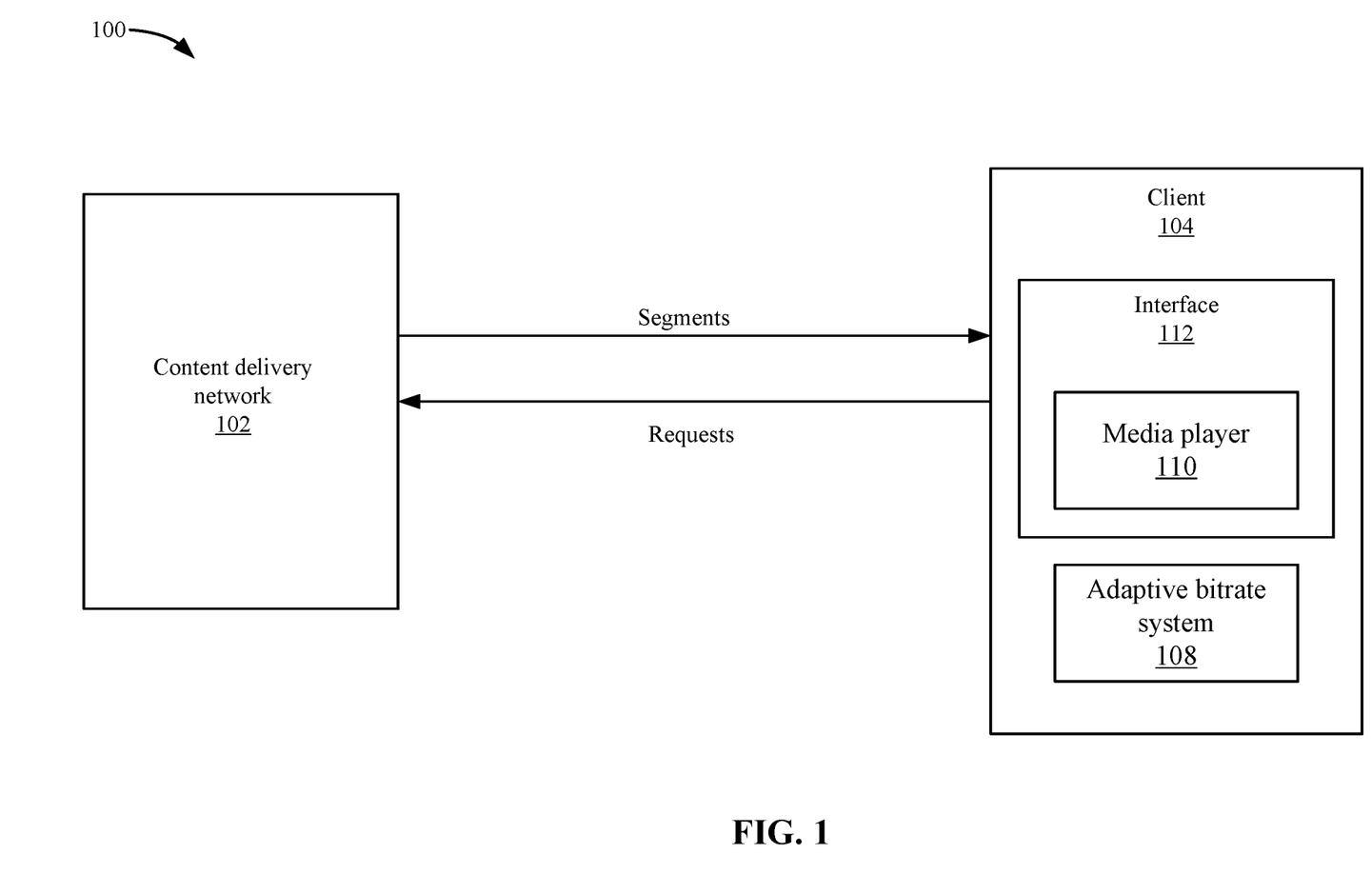
FIG. 1 depicts a simplified system for streaming segments of content according to some embodiments.

FIG. 1 depicts a simplified system 100 for streaming segments of content according to some embodiments. System 100 includes the content delivery network 102 and a client 104. Although a single instance of content delivery network 102 and client 104 are shown, multiple instances of content delivery network 102 and client 104 may be appreciated. For example, multiple clients 104 may be requesting content from a single content delivery network 102 or multiple content delivery networks 102.

Content delivery network 102 includes servers that can deliver content to client 104. For example, content delivery network 102 may include one or more servers that can deliver the content to client 104. In some embodiments, content delivery network 102 delivers segments of video to client 104. The segments may be a portion of the video, such as six seconds of the video. A video may be encoded in multiple profiles that correspond to different levels, which may be different levels of bitrates or quality. Client 104 may request a segment of video from one of the profile levels based on current network conditions. For example, client 104 may use an adaptive bitrate algorithm to select the profile for the video based on the estimated current available bandwidth and other network conditions.

Client 104 may include a mobile phone, smartphone, set top box, television, living room device, tablet device, or other computing device. Client 104 may include a media player 110 that is displayed on an interface 112. Media player 110 or client 104 may request content from content delivery network 102. In some embodiments, the content may be video, audio, or other content. Media player 110 may use an adaptive bitrate system 108 to select a profile when requesting segments of the content. In response, content delivery network 102 may deliver (e.g., stream) the segments in the requested profiles to client 104 for playback using media player 110.

A profile ladder may be provided to client 104 for segments that can be requested. The profile ladder may list different profiles for each segment. Adaptive bitrate system 108 may use an adaptive bitrate algorithm to determine which profile to select for each segment. Client 104 can send requests for segments that are associated with a profile. For example, client 104 may use identifying information for a profile to request a segment. Content delivery network 102 may then send the segment of video for the requested profile to client 104, which can then display the segment in media player 110 on interface 112. Client 104 may change the profiles that are requested for segments based on current network conditions.

The following will describe the use of the adaptive bitrate algorithm to improve the playback experience. As discussed above, the decision on which profile to select may be based on a quality change.

Profile Ladders

Figure 2A:
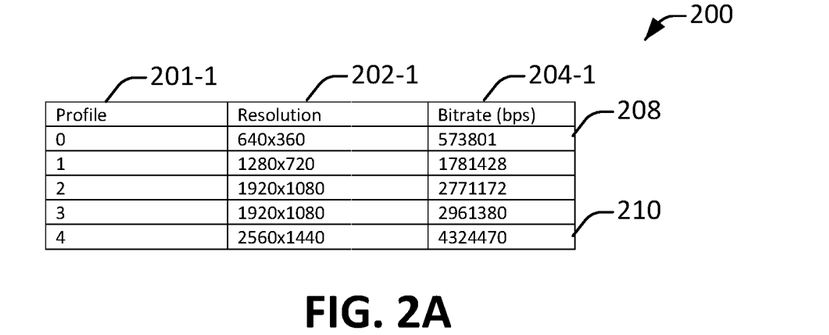
FIG. 2A depicts a first profile ladder that may be associated with a first period according to some embodiments.
Figure 2B:
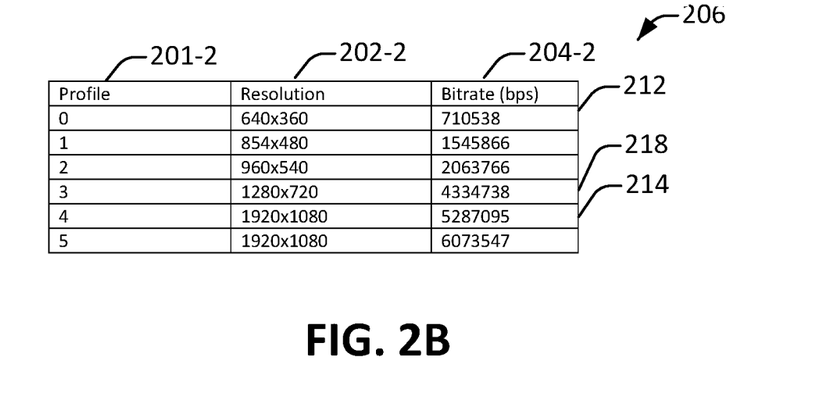
FIG. 2B depicts a second profile ladder according to some embodiments.
Figure 2C:
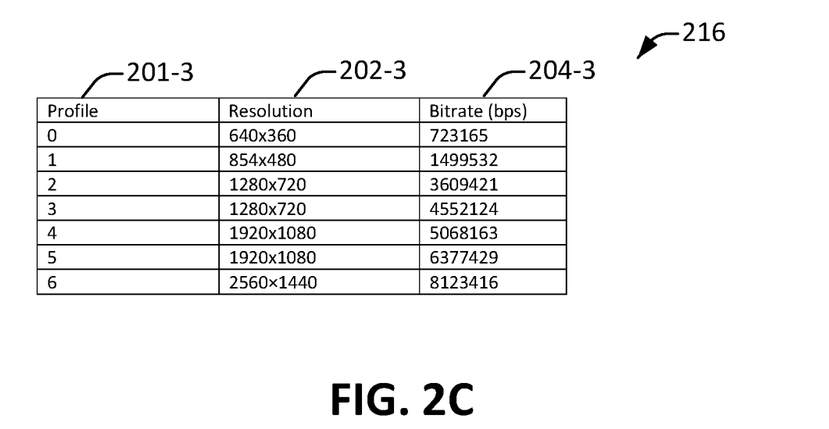
FIG. 2C depicts a third profile ladder according to some embodiments.

FIGS. 2A to 2C depict different profile ladders according to some embodiments. A profile ladder includes profiles that can be used for requesting content. The profiles include different levels that are associated with one or more characteristics, such as a bitrate characteristic or a quality characteristic. The bitrate may be the number of bits per second that is associated with the segment, and the quality characteristic may indicate the quality of a video (e.g., a resolution or other metric). A resolution of the video may be based on a number of pixels in a frame, and a higher resolution is associated with a higher quality. A higher bitrate may be associated with a higher quality also. The level of a profile in the profile ladder may be determined based on how the video is transcoded for that level, such as a video may be transcoded at 400000 bps and a resolution of 1920×1080. The resolution of 1920×1080 may represent a number of pixels that are used in the video.

FIG. 2A depicts a first profile ladder 200 that may be associated with a first period according to some embodiments. In some examples, profile ladder 200 may be associated with a bumper period where bumper content is played. Profile ladder 200 includes a first column 201-1 that lists the profile, a second column 202-1 that displays the resolution of different profiles, and a third column 204-1 that displays an associated bitrate for the profiles. In each row of profile ladder 200, a different profile level is listed for profiles 0-4, where profile #0 is considered a lower profile and profile #4 is considered a higher profile. For example, at 208, a profile #0 may have a resolution of 640×360 and a bitrate of 573801 bps (bits per second). Also, at 210, a profile #4 may have a resolution of 2560×1440 and a bitrate of 4324470 bps. Each profile may have an associated resolution and bitrate.

FIG. 2B depicts a second profile ladder 206 according to some embodiments. In some examples, second profile ladder 206 may be used in a second period that may be associated with a supplemental content period where supplemental content is displayed. Second profile ladder 206 may include different resolutions or bitrates in columns 202-2 and 204-2 compared to first profile ladder 200, and also includes six profiles #0 to #5 in column 201-2. In some embodiments, at least one resolution or bitrate may be different from profile ladder 200. For example, at 212, a profile #0 in second profile ladder 206 includes a resolution of 640×360 and a bitrate of 710538 bps. In this case, a resolution of profile #0 in second profile ladder 206 is the same as found in profile #0 in first profile ladder 200. However, in second profile ladder 206, the bitrate in profile #0 at 212 of 710538 is different than the bitrate of 573801 in profile #0 in first profile ladder 200 at 208. For profile #4 of both profile ladders, the resolution and bitrate are different as shown at 210 and 214. That is, the resolution of profile #4 in first profile ladder 200 at 210 is 2560×1440, which is different than the resolution of 1920×1080 at 214 in second profile ladder 206. Similarly, the bitrate of 4324470 at 210 in first profile ladder 200 is different from the bitrate of 5287095 at 214 in second profile ladder 206. Also, other differences exist between the two profile ladders, such as the profile #5 of second profile ladder 206 is not included in first profile ladder 200.

FIG. 2C depicts a third profile ladder 216 according to some embodiments. In some examples, third profile ladder 216 may be used in a third period that may be associated with a main content period where main content is displayed. Third profile ladder 216 includes different resolutions or bitrates in columns 202-3 and 204-3 compared to first profile ladder 200 and second profile ladder 206, and also a different number of profiles #0 to #6 in column 201-3. Although three profile ladders are discussed, different numbers of two or more profile ladders may be appreciated.

A problem may occur when the profile ladder changes among first profile ladder 200, second profile ladder 206, or third profile ladder 216 during a streaming session. In this case, the quality of the segments may change when profile ladder changes for segments, such as when the profile ladder changes for consecutive segments even when the bitrate remains similar. For example, high-resolution bumper content may turn into lower resolution supplemental content after the period change. In some examples, if the available bandwidth is 4400000 bps, profile #4 at 210 in first profile ladder 200 may be used by the adaptive bitrate algorithm to request video segments during the first period. However, when the period changes to use second profile ladder 206, profile #3 at 218 may be selected by the adaptive bitrate algorithm. Because the bitrate for profile #3 is 4334738 bps, which is the closest bitrate to the available bandwidth at this time of 4400000 bps. However, the quality of segment in profile #3 of second profile ladder 206 is the resolution of 1280×720, which is a much lower quality than the resolution of 2560×1440 in profile #4 of first profile ladder 200 at 210. Thus, when a video segment at the resolution 2560×1440 is viewed and then a video segment at the resolution 1280×720 is viewed thereafter, the quality difference may be noticeable, and the playback experience is degraded. If a profile with a higher quality is used in second profile ladder 206, such as profile #4 at 214, the quality may be increased to the resolution of 1920×1080, but the bitrate required to download the segment is 5287095 bps. If profile #4 is used, then playback problems may result, such as re-buffering because the bitrate of the video segment is higher than the available bandwidth of 4400000 bps. Similar problems may result when transitioning from second profile ladder 206 to third profile ladder 216.

To overcome the above problems, adaptive bitrate system 108 may consider a quality change when determining a change in profiles.

Adaptive Bitrate Algorithm

Figure 3:
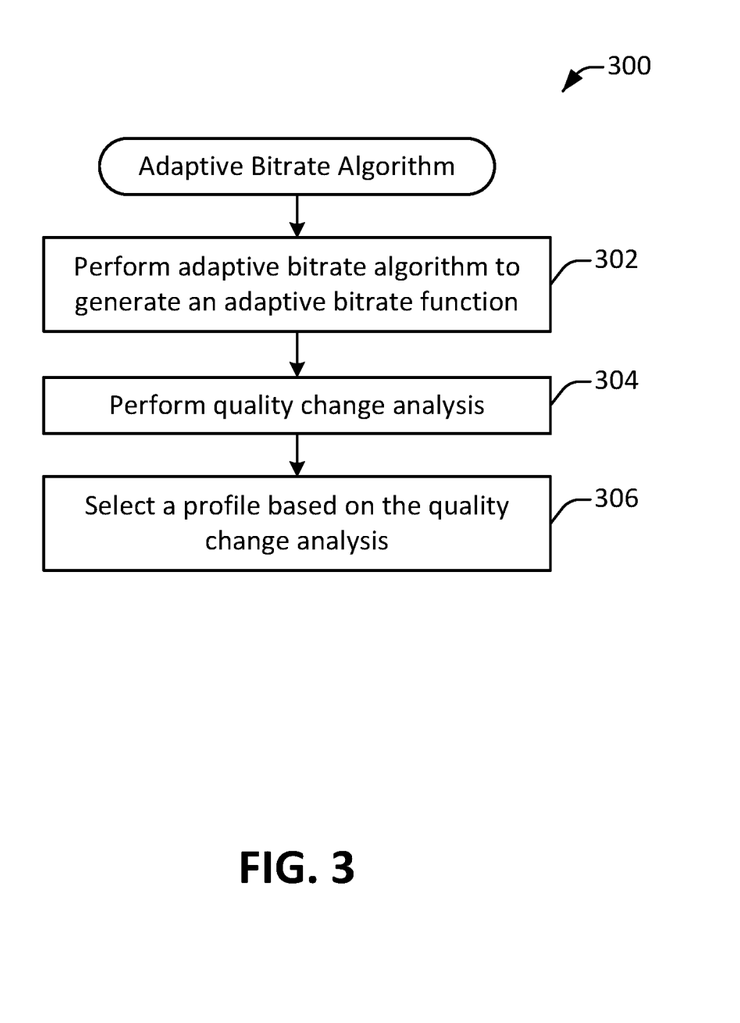
FIG. 3 depicts a simplified flowchart method for selecting a profile using an adaptive bitrate algorithm according to some embodiments.
Figure 6A:
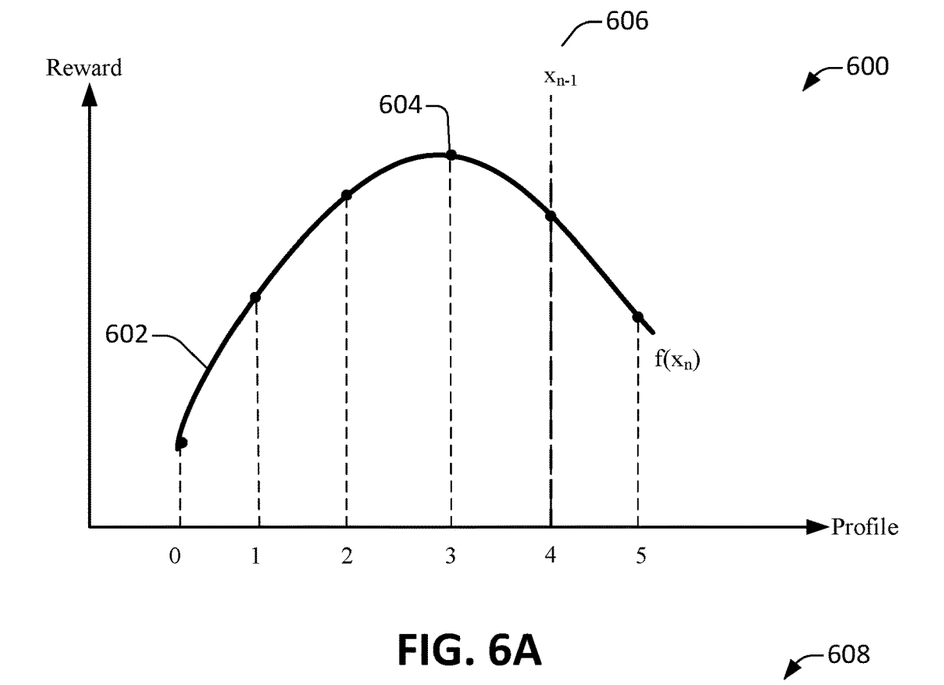
FIG. 6A depicts a graph of the adaptive bitrate function $f(x_n)$ according to some embodiments.

FIG. 3 depicts a simplified flowchart 300 of a method for selecting a profile using an adaptive bitrate algorithm according to some embodiments. At 302, adaptive bitrate system 108 executes the adaptive bitrate algorithm to generate an adaptive bitrate function. The adaptive bitrate function may represent the profiles of the profile ladder with a reward value. For example, based on the analysis of estimated available bitrate for the current network conditions, and the bitrate of associated profiles, the adaptive bitrate algorithm may generate a reward value for each profile. The adaptive bitrate function may also take into account other factors, such as rebuffering possibilities. The adaptive bitrate function may be used to determine the reward values. An example of the adaptive bitrate function will be described in FIG. 6 below.

Adaptive bitrate system 108 may leverage available bandwidth and respective profile's bitrate information to select the profile. The adaptive bitrate algorithm may select the highest profile that has a bitrate less than available bandwidth. The adaptive bitrate algorithm may also consider other factors, such as buffer length to select the profile with the highest bitrate while avoiding rebuffering and frequent bitrate changes.

At 304, the adaptive bitrate system 108 performs a quality change analysis. The quality change analysis may involve analyzing a change in quality level or profile level. Examples of a change in quality level and profile level will be described in more detail below in FIGS. 4 to 7. The quality change analysis may adjust reward values that may have been originally generated by the adaptive bitrate algorithm for the adaptive bitrate function.

At 306, adaptive bitrate system 108 selects a profile based on the quality change analysis. For example, a previous profile may have been equivalent to a profile #5 in the profile ladder for a segment to be requested, which has a resolution of 1920×1080. The original adaptive bitrate function may have indicated a profile #1 provides the highest reward. However, the quality change analysis indicates the change in quality may be too great and may cause the viewer experience to be degraded. The quality change analysis may indicate the profile #3 should be selected for the next segment that is requested. Profile #1 may have a resolution of 854×480, but profile #3 may have a resolution of 1280×720. The resolution of 1280×720 may be closer to the resolution of 1920×1080 of the last segment. Using profile #3 in the new profile ladder may provide an improved viewing experience in which consecutive video segments include more similar quality. This may smooth the viewer experience and abrupt changes in quality may not be noticed by a viewer. Also, the new profile that is selected may smooth the bitrate change across multiple segments, which may improve the playback experience.

Quality Change Analysis

Figure 4:
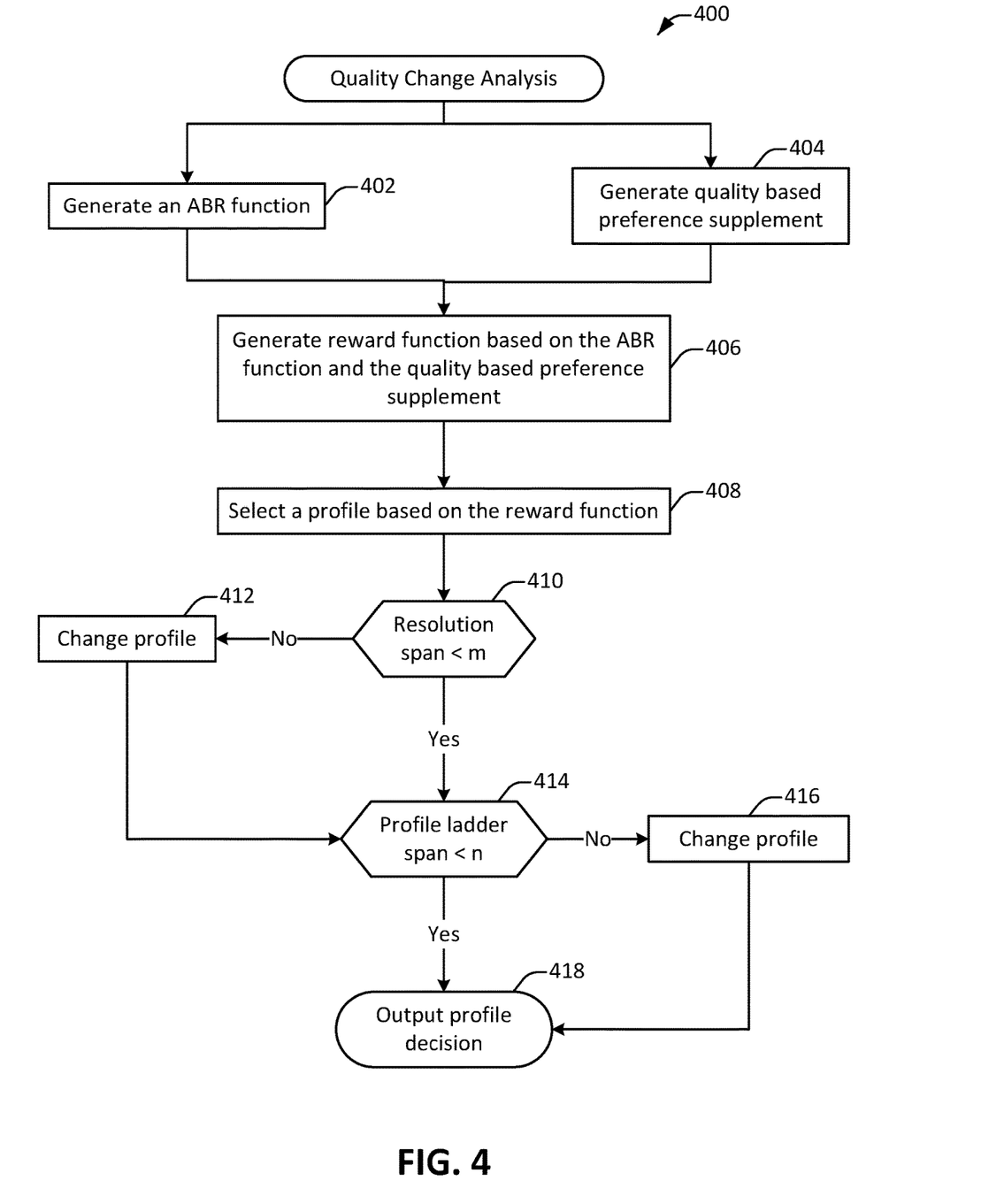
FIG. 4 depicts a simplified flowchart of the quality change analysis according to some embodiments.

FIG. 4 depicts a simplified flowchart of the quality change analysis according to some embodiments. At 402, adaptive bitrate system 108 generates an adaptive bitrate function. The adaptive bitrate function may be based on the estimated available bitrate and the bitrates associated with a profile ladder. Also, at 404, adaptive bitrate system 108 generates a quality-based preference supplement. The quality-based preference supplement may capture a restriction on the change in quality.

The video change analysis may analyze the change in quality level and also a change in profile level. The change in quality level may be analyzed in 406 to 408 and the change in profile level may be analyzed in 410 to 416.

At 406, adaptive bitrate system 108 generates a reward function based on the adaptive bitrate function and the quality-based preference supplement. The reward function may represent the ABR function with an adjustment based on the quality-based preference supplement. In some embodiments, the adaptive bitrate algorithm may be based on bandwidth and the bitrate of respective profiles. The adaptive bitrate function $f(x_n)$ may be calculated as follows:

$$f_{bandwidth\text{-}based}(x_n) = b_n - \text{bandwidth, with condition of } b_n < \text{bandwidth,}$$

where the $b_n$ is the bitrate of selected profile $x_n$ and bandwidth is the estimated available bandwidth. The higher value for $f(x_n)$ is considered a better choice, which means the adaptive bitrate algorithm selects the highest profile with bitrate ($b_n$) less than the estimated available bandwidth. Another adaptive bitrate algorithm may take into account other characteristics, such as rebuffering. The f(x) function may be:

$$f_{MPC}(x_n)b_n - \alpha * r_n - \beta * |b_n - b_{n-1}|,$$

where the $b_n$ is the bitrate of selected profile $x_n$, $b_{n-1}$ is the bitrate of previously selected profile $x_{n-1}$, and $r_n$ is the estimated rebuffering time when selecting profile $x_n$. $\alpha$ and $\beta$ are the super parameters to balance the preferences to different perspectives of rebuffering and bandwidth. The goal of this adaptive bitrate algorithm is to select the profile with the highest bitrate, but not cause too much rebuffering and avoid the frequent bitrate changes.

The quality-based preference supplement may be represented as $s(x_n, x_{n-1})$ in a function $r(x_n)$ as follows:

$$r(x_n) = S(x_n, x_{n-1}) + f(x_n).$$

The quality-based preference supplement, $s(x_n, x_{n-1})$, may be calculated as follows:

$$s(x_n, x_{n-1}) = c * \log(n * (\text{delta}(x_n, x_{n-1}) + 1)),$$

$$\text{where delta}(x_n, x_{n-1}) = \frac{q(x_n) - q(x_{n-1})}{q(x_{n-1})}.$$

Here, the function $q(x_n)$ is a quality metric when selecting profile $x_n$, $q(x_{n-1})$ is a quality metric for the previously selected profile $x_{n-1}$. The term "c" is a super parameter that may be used to expand or shrink the output of the log function. The quality metric that is analyzed may be different. In some embodiments, video multi-method assessment fusion (VMAF) may be used as the quality metric. However, other metrics may be used, such as peak signal to noise ratio (PSNR), or other metrics. Here, the value of delta($x_n, x_{n-1}$) means the perceptive quality change ratio when selecting the next video profile. The function of $s(x_n, x_{n-1})$ may be log(x+1). The quality-based preference supplement may add a negative preference when the quality level will be reduced. The larger the quality reduction, the less preference for change is added by the quality-based preference supplement. Accordingly, the quality-based preference supplement may make it less likely to select a lower quality level as the change from the last requested quality level increases. An example of the quality-based preference supplement will be described in FIG. 5. Also, the generation of the reward function will be discussed in FIGS. 6A and 6B below.

At 408, adaptive bit rate system 108 selects a profile based on the reward function. For example, a profile that has an associated highest reward is selected. In some examples, a profile #3 may be selected. The process then moves on to the profile level change decision.

The profile level change decision may analyze a change in resolution or a change in profile level. Although the analysis is described in series, the analysis may be determined in different ways, such as performing the profile level span analysis first and the resolution span analysis second. Also, the profile level span analysis or resolution span analysis may be used independently. At 410, adaptive bitrate system 108 determines if the resolution span is less than a first threshold m (e.g., resolution span<m). Although a condition of less than is described, the condition may be any condition that is met, such as the condition may be less than or equal to a threshold. The resolution span may be the change in resolution that may result from the previous profile selected if a current profile is selected. If the resolution span is less than the threshold m, the profile meets the resolution span requirement. The resolution span may be based on the resolution level. For example, there may be five levels of resolution may be 640×360, 854×480, 1280×720, 1920×1080, and 2560×1440. In this case, the resolution of 1280×720 is two resolution levels from the resolution of 2560×1440, the resolution of 640×360 is four resolution levels from the resolution of 2560×1440, etc. Other methods may be used to determine the resolution span, such as using the difference in the number of pixels (e.g., 2560×1440–640×360).

At 412, if the resolution span meets the threshold m (e.g., greater than or equal to m), then adaptive bitrate system 108 changes the profile. For example, adaptive bitrate system 108 may select a profile that meets the resolution span requirement. Then, after changing the profile, or if the resolution span meets the threshold m (e.g., less than m), at 414, adaptive bitrate system 108 determines whether the profile ladder span is less than a threshold n. Although a condition of less than is described, the condition may be any condition that is met, such as the condition may be less than or equal to a threshold. The profile level span may be determined based on the previous profile level and the selected profile level. The previous profile may be from another profile ladder than the current profile ladder of the segment to be requested. The previous profile may be inserted into the current profile ladder based on the resolution and bitrate of the previous profile and the resolution and bitrates of the current profile ladder. Using current profile ladder 216 in FIG. 2C as an example, if the previous selected profile may have the resolution of 1280×720 with 3000 kbps, adaptive bitrate system 108 may insert the previous profile into current profile ladder 216 based on its resolution and bitrate. In some cases, the location may be between profile #1 (854×480 with 1499532 bps) and profile #2 (1280×720 with 3609421 bps), because the resolution is higher than profile #1 but the bitrate is lower than profile #2. Alternatively, a profile in the current profile ladder may be selected based on the previous profile ladder, such as the profile that includes a resolution or bitrate that is the most similar to the previous profile. A profile ladder may have profiles that may include the same resolution, such as there are two profile levels with 1280×720 resolution and 1920×1080 resolution. The profile level span may not be based on the resolution, but is rather based on the profile level. If the previous profile is profile #6 and the selected profile #2, then the profile level span is 4 (e.g., 6−2=4)

If the profile ladder span is not less than the threshold n, at 416, adaptive bitrate system 108 may change the profile level. For example, adaptive bitrate system 108 may change the profile level from a profile level #3 to a profile level #4 as an example. This makes the profile level span to be two profile levels. After changing the profile, the process proceeds to 418 to output the profile decision. If the profile ladder span is less than the threshold n, at 418, adaptive bitrate system 108 outputs the profile decision. The profile decision may be a profile #4, which may be profile selected at 408, 412, or 416 in FIG. 4.

Quality Level Decision

Figure 5:
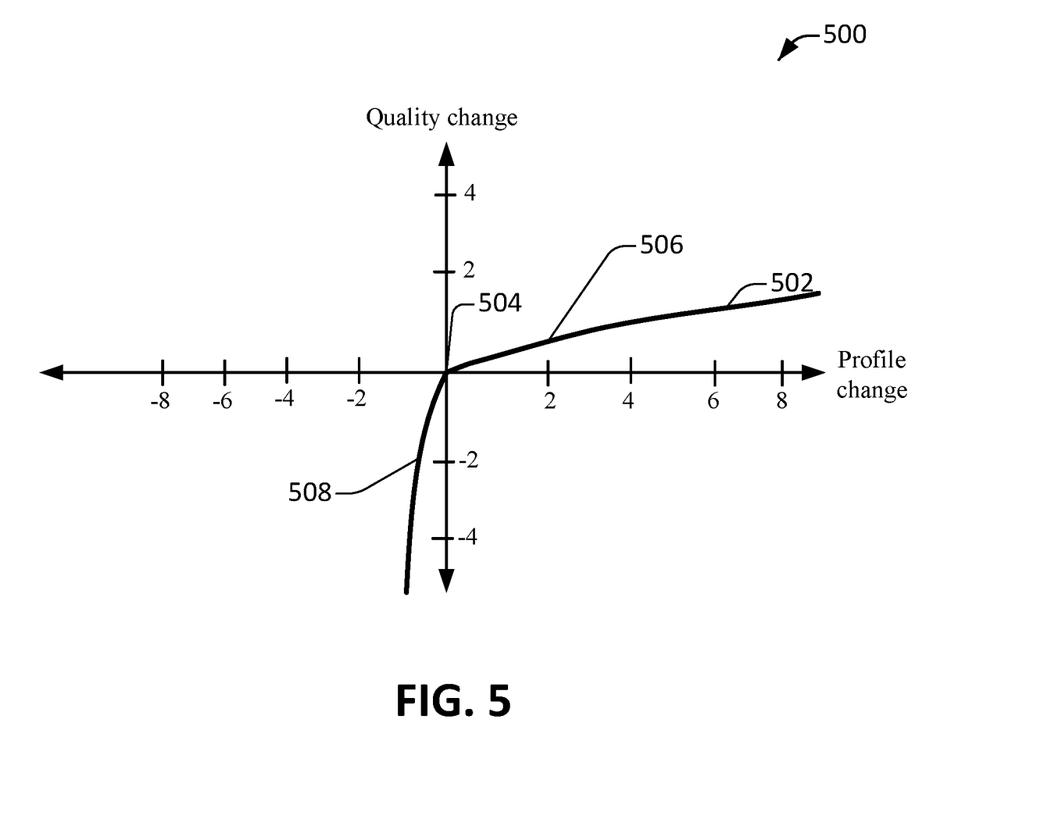
FIG. 5 depicts a graph of a quality-based preference supplement according to some embodiments.

The following will now discuss the quality level decision that was discussed above at 406 and 408 in FIG. 4 in more detail. FIG. 5 depicts a graph 500 of a quality-based preference supplement according to some embodiments. The value of the X-axis is the change in profile level from the last selected profile. The Y-axis is the change in quality.

A line 502 may represent the quality-based preference supplement. The use of the quality-based preference supplement may add a negative preference when the video quality may be reduced. The more quality reduction, the less preference is given. For example, at 504, when the quality level does not change, the value of the quality-based preference supplement is zero. If the profile quality level increased by two levels, then the value for the quality-based preference supplement may be 0.5 as shown at 506. For example, if the previous profile is #3 and the selected profile is profile #5, the difference is two levels. The x-axis is the profile change in levels, and the value of 2 is found on the positive side of the x-axis. The corresponding value for the quality-based preference supplement is around 0.5. However, if the quality level reduced by −1, then the quality-based preference supplement value may be −2 as shown at 508. For example, if the previous profile is #5 and the selected profile is profile #4, the difference is a negative one level (−1). The value of −1 is found on the negative side of the x-axis. The corresponding value for the quality-based preference supplement is around −2. As the profile level changes past −1 level changes, the quality-based preference supplement becomes even more negative.

The following will show an example to demonstrate the calculation of the reward function for selecting a profile using the quality-based preference supplement. FIG. 6A depicts a graph 600 of the adaptive bitrate function $f(x_n)$ according to some embodiments. The X-axis of graph 600 may be the profile level, and the Y-axis may represent the value of the reward that is assigned to respective profiles. The adaptive bitrate function $f(x_n)$ may represent the reward that is associated with profiles without considering the quality-based preference supplement. A line 602 represents the adaptive bitrate function and assigns the values to respective profile levels that are shown on the X-axis. In this profile ladder, there are six profiles total, (e.g., profile #0 to profile #5). The last downloaded profile is represented as $x_{n-1}$ at 606. Each point on line 602 is associated with a reward value that is calculated by the adaptive bitrate function for each profile level. A higher value represents a better choice for the profile level according to the adaptive bitrate algorithm. In this example, profile level #3 has the highest reward value as shown at 604.

Figure 6B:
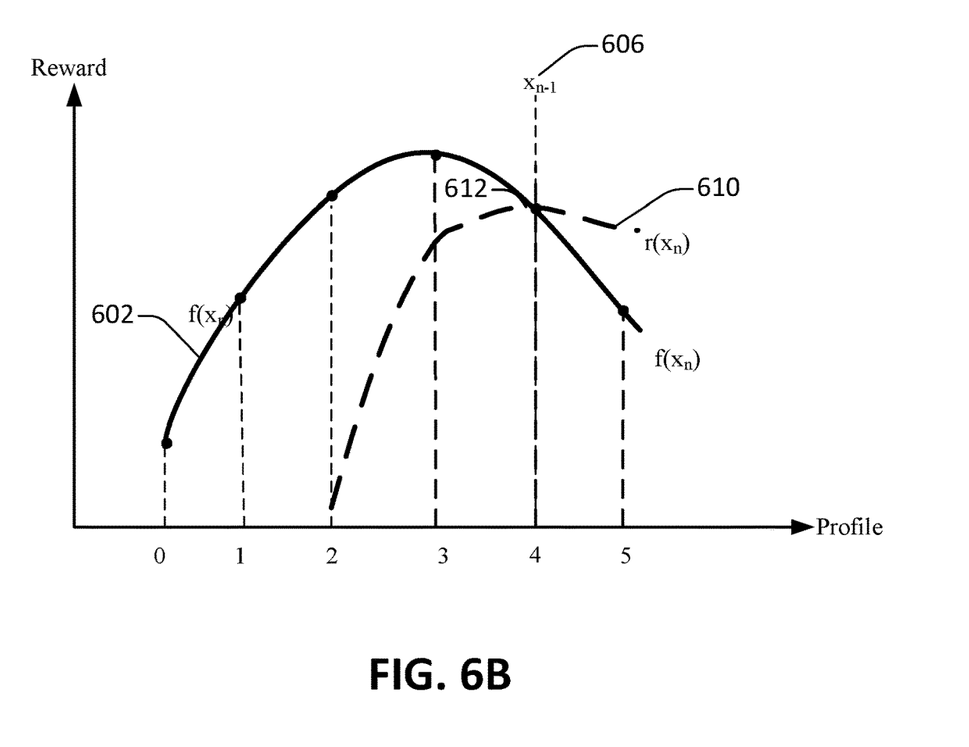
FIG. 6B depicts an example of a graph that applies the quality change to the adaptive bitrate function according to some embodiments.

As mentioned above, the original adaptive bitrate algorithm may not have considered the quality change and would select profile #3. However, the following will show the advantages of considering the quality change. FIG. 6B depicts an example of a graph 608 that applies the quality change to the adaptive bitrate function according to some embodiments. Line 602 shows the original adaptive bitrate function and the previously selected profile is shown at 606. Line 502 (not shown) from FIG. 5 of the quality-based preference supplement is used to adjust line 602, such as line 502 (not shown) is subtracted from line 602. Then, a line 610 represents the reward of function $r(x_n)$, which is based on the original adaptive bitrate function and the quality-based preference supplement. At 612, profile #4 now has the highest reward value, and not profile #3. There are also other differences, such as profile #5 has a higher reward compared to the original adaptive bitrate function. Also, the profiles 0, 1, and 2 have had their reward values reduced significantly as the quality based preference supplement adds a negative preference as the profile levels reduce the quality more compared to the previous profile The quality-based preference supplement has adjusted the reward values and profile #4 is selected with a highest reward value, which is closer in resolution to the last selected profile level. This may avoid a drastic quality drop while also considering the parameters of the original adaptive bitrate algorithm, such as network conditions or buffer information. Accordingly, an improved selection of the profile that considers the quality change is performed.

In some examples, the reward values of selecting different profiles when downloading a segment $x_n$ using the adaptive bitrate function may be as follows:

| $x_n$ | 0 | 1 | 2 | 3 | 4 | 5 |
|---|---|---|---|---|---|---|
| Reward ($f(x_n)$) | 1.2 | 2.3 | 3.0 | 3.8 | 2.9 | 2.5 |

The profile that is selected by the function $f(x)$ is profile #3. The previous downloaded segment $x_{n-1}$ was downloaded using profile #4. Based on the quality change, the $s(x_n, x_{n-1})$ function may have the following values:

| $s(x_n, x_{n-1})$ | 0 | 1 | 2 | 3 | 4 | 5 |
|---|---|---|---|---|---|---|
| Preference | −3.1 | −2.2 | −1.9 | −1.2 | 0 | 0.2 |

So, the final reward $r(x_n)=s(x_n, x_{n-1})+f(x_n)$ may be calculated as follows:

| $r(x_n)$ | 0 | 1 | 2 | 3 | 4 | 5 |
|---|---|---|---|---|---|---|
| Final reward | −1.9 | 0.1 | 1.1 | 2.6 | 2.9 | 2.7 |

The final profile selection will be profile #4 (with the highest reward) after considering the quality-based preference supplement. Although the same profile is selected in this example, the quality-based preference supplement may have different changes on the profile. For example, the quality-based preference supplement may change a profile from profile #1 to profile #3.

Figure 7:
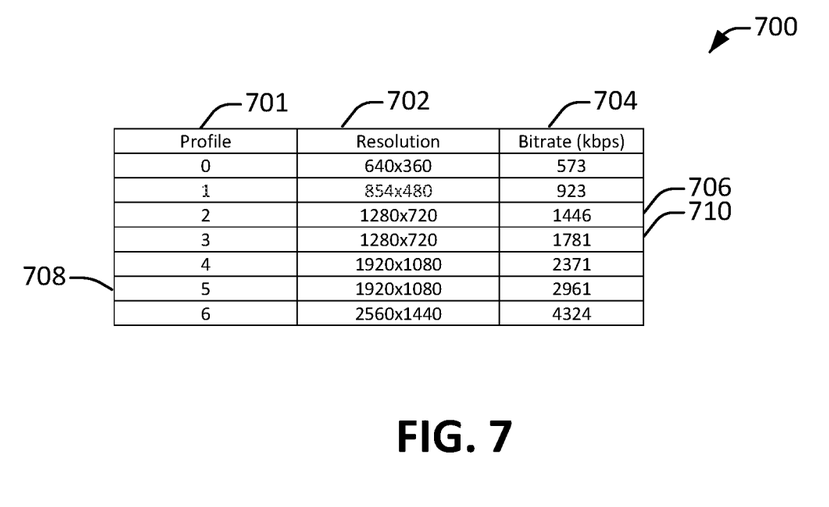
FIG. 7 depicts a profile ladder that includes profiles according to some embodiments.

In another example, a table of profiles is used to illustrate the resolution span decision. FIG. 7 depicts a profile ladder 700 that includes profiles according to some embodiments. A column 701 shows the profile levels of profile #0 to profile #6, a column 702 is the resolution, and a column 704 is the bitrate. The resolution span may be calculated based on the selected profile that was selected at 408 in FIG. 4 and the quality of the previous profile that was last selected for the last segment. The quality for the previous profile #5 of the last segment is shown at 708 as a resolution of 1920×1080. It is noted that a different profile ladder may have been used to request the previous segment, such as the profile ladder in FIG. 2A. An equivalent profile level may be selected in the current profile ladder for the previous profile.

If the selected profile is 854×480, the resolution span is two levels of resolution. That is, profile ladder 700 includes five levels of resolution of 640×360, 854×480, 1280×720, 1920×1080, and 2560×1440. The resolution of 854×480 is two resolution levels from the previous selected resolution of 1920×1080. If the resolution span needs to be less than the threshold, a value of m=2 may cause the resolution span to not be less than the threshold m. In this case, adaptive bitrate system 108 changes the profile. For example, the profile that is selected is the profile level that is one level away from the resolution of 1920×1080, which is the resolution of 1280×720 for a profile #2 at 706.

Profile Level Decision

The profile level decision analyzes the number of profile levels that are changed. Referring to FIG. 7, each row of profile ladder 700 may be a different profile level. As can be seen, some resolutions of profiles may include the same resolution, such as profile levels #2 and #3 have the 1280×720 resolution and profile levels #4 and #5 have the same resolution of 1920×1080. If the previous profile level is considered to be the profile #5 at 708, and the selected profile is profile #2 at 706, the profile level span is 3, (2961 kbps→2371 kbps→1781 kbps->1446 kbps).

If the threshold is less than three profile levels, then the profile level span may not be met because the profile level span is equal to 3. Accordingly, adaptive bitrate system 108 may change the profile level. For example, at 710, adaptive bitrate system 108 may change the profile level to profile #3 with a resolution of 1280×720 and 1781 kbps. This makes the profile level span to be two profile levels. Note that the quality is still the same, but the bitrate is increased. The change in profile level attempts to ensure the smoothness in the change in bitrate when changing profiles. For example, the higher bitrate may mean a higher quality. For example, the higher bitrate may allow other quality characteristics to be increased, such as a higher bitrate profile in the same resolution maybe allow a change from 30 frames per second (fps) to 60 fps, or a change from standard definition (SDR) to high definition (HDR), which results in the higher quality user experience.

The above is useful when changing periods in which the profile ladder may change may limit drastic quality changes. Also, the use of the quality change may change the profile that is selected for at least one segment compared to the profile that may have been selected from the adaptive bitrate function. However, after that change is made, the next segment may change the profile level for the next segment again. This may gradually reduce the quality of the video segments being requested consecutively until the desired bitrate is achieved based on the current network conditions. By limiting the number of video segments that are changed based on the quality change, the chance of re-buffering may be limited. But, the viewer experience is vastly improved.

CONCLUSION

Figure 8:
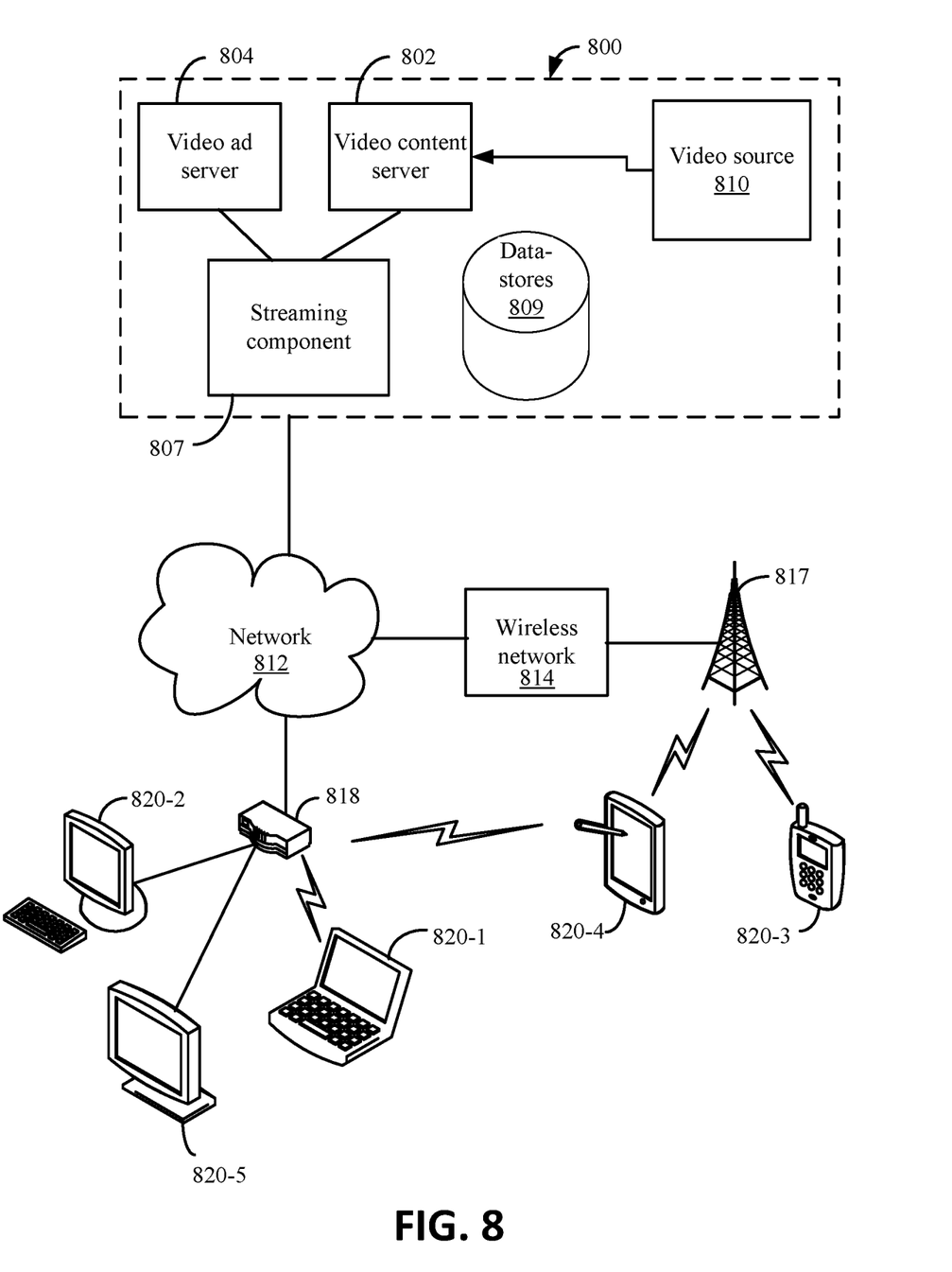
FIG. 8 depicts a video streaming system in communication with multiple client devices via one or more communication networks according to one embodiment.

Accordingly, the adaptive bitrate algorithm may be improved by considering the quality change. The quality change may analyze the quality level change and the profile level change. Considering these two changes, the playback experience may be improved by providing a smoother playback experience that may not drastically change the quality level or the profile level.
System Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers.

The video data may also include audio or only audio may be used. The video streaming system 800 may include one or more computer servers or modules 802, 804, and 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless network 814 (e.g., a wireless cellular telecommunications network (WCS)), or some combination of these or similar networks.

One or more client devices 820 may be in communication with the video streaming system 800, via the data communication network 812, wireless network 814, or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for wireless network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HyperText Transfer Protocol (HTTP) and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
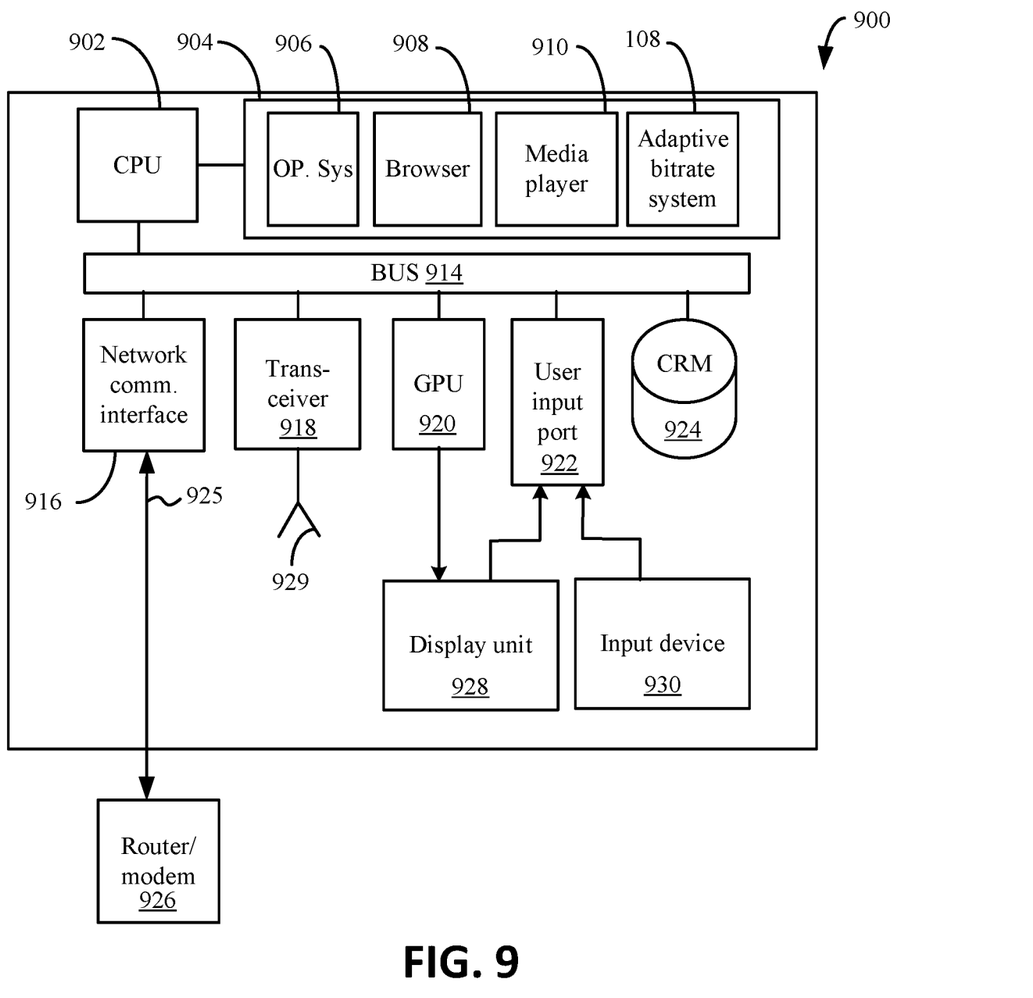
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include adaptive bitrate system 108. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules for operating system 906, browser 908, and media player 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A network communication (comm.) interface 916 may also be connected to the bus 914. The network communication interface 916 may provide or support two-way data communication between the apparatus 900 and one or more external devices, e.g., the streaming system 800, optionally via a router/modem 926 and a wired or wireless connection 925. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    calculating, by a computing device, a reward function for an adaptive bitrate function that is based on a bandwidth and profiles in a profile ladder for a current segment of content, wherein the reward function indicates a first profile should be selected for the current segment;
    performing, by the computing device, a quality change analysis to select a second profile from the profile ladder, wherein the quality change analysis analyzes a quality change that is based on a previously selected profile from a prior segment and profiles in the profile ladder; and
    requesting, by the computing device, the second profile from the profile ladder for the current segment.

2. The method of claim 1, wherein:
    the profile ladder comprises a first profile ladder, and
    the prior segment is associated with a second profile ladder.

3. The method of claim 2, wherein the second profile ladder includes at least one profile with a different bitrate or resolution compared to the bitrate or resolution of profiles in the first profile ladder.

4. The method of claim 2, wherein the second profile ladder includes a different number of profiles compared to the first profile ladder.

5. The method of claim 2, wherein:
    a third profile in the first profile ladder is associated with the bandwidth, and
    the second profile in the second profile ladder is associated with the bandwidth, and
    the third profile is associated with a different quality characteristic value than the second profile.

6. The method of claim 5, wherein the quality characteristic value is a resolution.

7. The method of claim 1, wherein the reward function comprises a first reward function, and wherein performing the quality analysis comprises:
    generating a quality supplement that is based on a quality change from the previously selected profile from the prior segment and profiles of the profile ladder; and
    calculating a second reward function that is based on the first reward function and the quality supplement.

8. The method of claim 7, wherein:
    the first reward function assigns first values to profiles in the profile ladder, and
    the quality supplement adjusts one or more of the first values of the first reward function to generate second values for the second reward function.

9. The method of claim 8, wherein the second values are used to select the second profile.

10. The method of claim 9, wherein:
    a highest valued second value is used to select the second profile, and
    the second profile is different from a highest valued profile using the first values.

11. The method of claim 7, wherein:

the quality supplement applies a negative preference to profiles where the quality is reduced from the previously selected profile, and a quality metric is used to measure a quality reduction between profiles and the previously selected profile.

12. The method of claim 1, wherein performing the quality analysis comprises:

comparing the first profile to the previously selected profile; and selecting the second profile based on the comparing.

13. The method of claim 12, wherein the second profile is selected when a difference in profile levels from the first profile does not meet a threshold.

14. The method of claim 12, wherein the second profile is selected when a difference in quality characteristic from the first profile does not meet a threshold.

15. The method of claim 12, wherein:

the second profile is selected when a difference in quality characteristic from the first profile does not meet a first threshold, and the second profile is selected when a difference in profile levels from the first profile does not meet a second threshold.

16. A non-transitory computer-readable storage medium having stored thereon computer executable instructions, which when executed by a computing device, cause the computing device to be operable for:

calculating a reward function for an adaptive bitrate function that is based on a bandwidth and profiles in a profile ladder for a current segment of content, wherein the reward function indicates a first profile should be selected for the current segment;

performing, a quality change analysis to select a second profile from the profile ladder, wherein the quality change analysis analyzes a quality change that is based on a previously selected profile from a prior segment and profiles in the profile ladder; and requesting the second profile from the profile ladder for the current segment.

17. A method comprising:

calculating, by a computing device, a first reward function for an adaptive bitrate function that is based on a bandwidth and profiles in a profile ladder for a current segment of content, wherein the first reward function indicates a first profile should be selected for the current segment;

generating, by the computing device, a quality supplement that is based on a quality change from a previously selected profile from a prior segment and profiles of the profile ladder;

generating, by the computing device, a second reward function that is based on the first reward function and the quality supplement, wherein the second reward function indicates a second profile should be selected for the current segment;

comparing, by the computing device, a first span that is associated with a quality characteristic based on the previously selected profile and the second profile;

when the first span does not meet a first threshold, selecting, by the computing device, a third profile that meets the first threshold;

comparing, by the computing device, a second span that is associated with a profile level in the profile ladder based on the previously selected profile and the second profile; and when the second span does not meet a second threshold, selecting, by the computing device, a fourth profile that meets the first threshold.

18. The method of claim 17, further comprising:

requesting, by the computing device, one of the second profile, the third profile, and the fourth profile from the profile ladder for the current segment.

19. The method of claim 17, further comprising:

when the first span meets the first threshold, not selecting the third profile; and when the second span meets the second threshold, not selecting the fourth profile.

20. The method of claim 19, wherein:

the second profile is selected when the first span meets the first threshold, and the second span meets the second threshold.

* * * * *